United States Patent Office 2,723,978
Patented Nov. 15, 1955

2,723,978
2-AMINO-5-ALKENYL-6-PHENYL-4-PYRIMIDOLS

Kurt J. Rorig, Evanston, Ill., assignor to G. D. Searle & Co., Chicago, Ill., a corporation of Illinois No Drawing. Application January 14, 1954,
Serial No. 404,146

5 Claims. (Cl. 260—256.4)

My invention relates to a new group of pyrimidine derivatives and, more particularly, to 2-amino-5-alkenyl-6-phenyl-4-pyrimidols of the structural formula

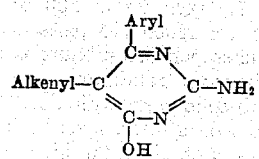

In the foregoing structural formula, the alkenyl radical is a univalent aliphatic radical containing a double bond and preferably containing 2 to 6 carbon atoms, such as vinyl, allyl, methallyl, crotyl, ethallyl, hexenyl and the like. Among the aryl radicals which I prefer for the purposes of my invention are such monocyclic aryl hydrocarbon radicals as phenyl and the lower alkylated phenyl radicals as tolyl, xylyl, cumyl, diethylphenyl, and the like.

These pyrimidols offer valuable therapeutic and, particularly, cardiovascular agents. They are diuretics and depressor drugs. They are also valuable as intermediates in the synthesis of other cardiovascular drugs. Thus treatment with phosphorus oxychloride converts the hydroxyl group in the 4-position to a chloro group. Treatment of the resulting 2-amino-4-chloro-5-alkenyl-6-arylpyrimidines with an alkali metal alcoholate yields the 2-amino-4-alkoxy-5-alkenyl-6-arylpyrimidines.

Heating of the 4-chloropyrimidines with ammonia yields the 2,4-diamino-5-alkenyl-6-arylpyrimidines.

Replacement of ammonia in this reaction by lower alkyl amines and lower dialkylamines yields compounds of the type

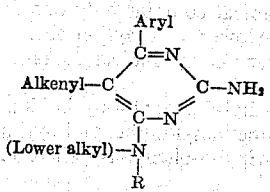

wherein R is hydrogen or a lower alkyl radical.

The 2-amino-5-alkenyl-6-aryl-4-pyrimidols of my invention form salts with a variety of inorganic and strong organic acids, including sulfuric, phosphoric, hydrochloric, hydrobromic, sulfamic, citric, ascorbic and related acids.

In the preparation of the compounds of my invention I prefer to heat, under anhydrous conditions, a simple acid addition salt of guanidine with a lower alkyl ester of an α-aroylalkenoic acid in a solvent such as a lower alkanol according to the following reaction scheme:

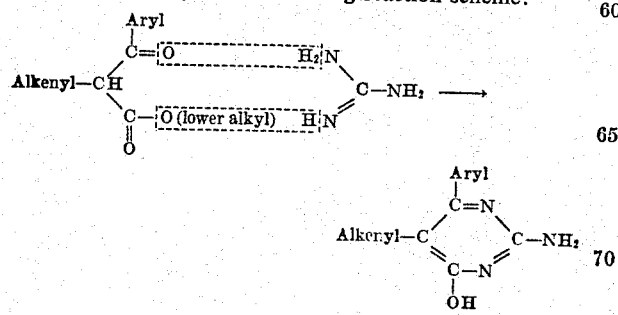

Where more vigorous reaction conditions are required such alkaline condensing agents as sodium methoxide are advantageously used.

The following examples illustrate in further detail the compounds which constitute my invention and methods for their preparation. However, my invention is not to be construed as limited thereby in spirit or in scope. It will be observed that the products are high-melting solids and I have found that the melting points are difficult to reproduce as they vary considerably with the reaction conditions used in their preparation. In these examples temperatures are indicated in degrees centigrade (° C.) and quantities of materials in parts by weight.

*Example 1*

To a solution of 23 parts of metallic sodium in 390 parts of ethanol, 192.2 parts of the ethyl ester of benzoylacetic acid are added. Under exclusion of moisture and with efficient stirring, the reaction mixture is maintained at gentle reflux while 176.4 parts of allyl iodide are added in the course of 20 minutes. After 7 additional hours of refluxing, the ethanol is removed under vacuum after which the residue is treated with 500 parts of water and 440 parts of benzene. The organic layer is separated, washed with water, dried over anhydrous sodium sulfate and evaporated. Upon vacuum distillation at 0.5 mm. pressure, the ethyl ester of 2-benzoyl-4-pentenoic acid is collected at 109–112° C.

A solution of 93 parts of the distillate, 38 parts of guanidine carbonate and 200 parts of ethanol is refluxed under anhydrous conditions for 15 hours, chilled and saturated with solid carbon dioxide. A precipitate forms which is collected on a filter, suspended in boiling water and chilled. The 2-amino-5-allyl-6-phenyl-4-pyrimidol thus obtained melts at about 302–304° C. with decomposition. It has the structural formula

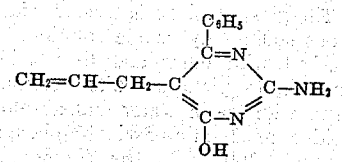

*Example 2*

In a reaction vessel equipped with a reflux condenser and a drying tube, 192.2 parts of the ethyl ester of benzoylacetic acid are added to a solution of 23 parts of metallic sodium in 390 parts of ethanol. Under efficient stirring, 135.8 parts of methallyl chloride are added in the course of 15 minutes. Refluxing is continued for 7 additional hours and the ethanol is then removed under vacuum. The residue is treated with 500 parts of water and 440 parts of benzene. The organic layer is isolated, washed with water, dried over anhydrous calcium sulfate and evaporated. Vacuum distillation of the residue at 0.4 mm. pressure yields the ethyl ester of 2-benzoyl-4-methyl-4-pentenoic acid which is collected at 110–113° C.

A solution of 98.5 parts of the ester thus obtained, 38 parts of guanidine carbonate and 200 parts of ethanol is refluxed under anhydrous conditions for 12 hours, chilled and saturated with solid carbon dioxide. The resulting precipitate is collected on a filter, stirred in boiling water and chilled. There is thus obtained the 2-amino-5-methallyl-6-phenyl-4-pyrimidol which melts at about 287–288° C. It has the structural formula

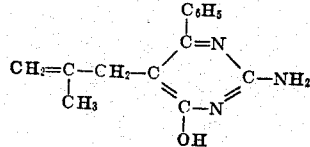

Example 3

In a reaction vessel equipped with a paddle stirrer, reflux condenser and addition funnel, 24 parts of sodium are dissolved in 440 parts of absolute ethanol and then treated with 201 parts of the ethyl ester of benzoylacetic acid. The mixture is heated to reflux and then 133 parts of 2-chloroethyl acetate are added. Refluxing is continued with stirring for 8 hours after which the ethanol is removed by distillation under vacuum. The residual oil is separated from the sodium chloride by extraction with ether. The ether extract is washed with ice-cold 5% aqueous sodium hydroxide solution and then with ice water until the water washings are neutral to litmus paper. The ether solution is dried over calcium sulfate and the ether is removed by vacuum distillation. The residual ethyl ester of α-benzoyl-γ-acetoxybutyric acid is taken up in 480 parts of absolute ethanol. To this are added 95 parts of guanidine carbonate and the heterogeneous mixture is refluxed for 16 hours. Then a solution of 5 parts of potassium hydroxide in 100 parts of water is added and the reaction mixture is refluxed for an additional 2 hours to complete the deacetylation.

The reaction mixture is then saturated with dry ice and the solid product is collected on a filter, washed with a large amount of warm water, then with absolute ethanol and dried. The white, very high-melting 2-amino-5-(β-hydroxyethyl)-6-phenyl-4-pyrimidol thus obtained has the structural formula

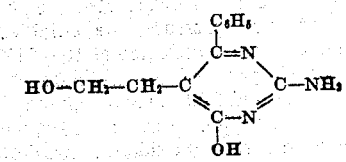

10 parts of this compound and 3 parts of freshly fused potassium acid sulfate are ground to a fine, intimate mixture in a mortar. This mixture is heated for an hour in a metal bath to 350° C. at which point water evolution ceases. The glassy residue is treated with 105 parts of 2-N aqueous sodium hydroxide solution. The basic extract is washed with ether and then acidified with glacial acetic acid to yield a white precipitate. The latter is washed with warm water and absolute ethanol leaving a residue of 2-amino-5-vinyl-6-phenyl-4-pyrimidol melting above 300° C. The compound has the structural formula

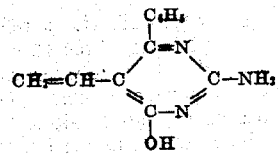

Example 4

Under anhydrous conditions, 218 parts of the ethyl ester of 2,5-xyloylacetic acid are added to a solution of 23 parts of metallic sodium in 400 parts of ethanol. Under efficient stirring, 157 parts of 5-chloro-1-pentene are added in the course of 20 minutes. Refluxing is continued for 9 hours with stirring after which the ethanol is distilled off under vacuum. The residue is extracted with ether and the extract is washed with an ice-cold 5% aqueous sodium hydroxide solution and with ice water until the washings are neutral. The ether solution is dried over anhydrous magnesium sulfate, filtered and evaporated. The residual ethyl ester of 2-(2′,5′-xyloyl)-6-heptenoic acid is taken up in 500 parts of absolute ethanol. To this are added 105 parts of guanidine carbonate and the heterogeneous mixture is refluxed for 12 hours under anhydrous conditions. It is then chilled and saturated with solid carbon dioxide. The precipitate formed is collected on a filter, stirred with boiling water and cooled. Thus is obtained the high-melting 2-amino-5-(δ-pentenyl)-6-(2,5-dimethylphenyl)-4-pyrimidol which has the structural formula

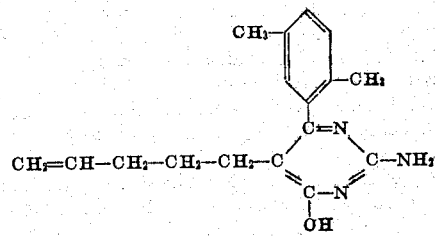

I claim:

1. A compound of the structural formula

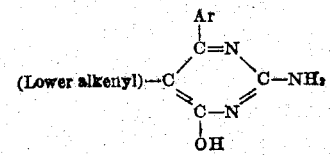

wherein Ar is a monocyclic aryl hydrocarbon radical containing less than 9 carbon atoms and wherein the lower alkenyl radical contains only one double bond.

2. 2-amino-5-(lower alkenyl)-6-phenyl-4-pyrimidol wherein the lower alkenyl radical contains only one double bond.

3. 2-amino-5-allyl-6-phenyl-4-pyrimidol.

4. 2-amino-5-methallyl-6-phenyl-4-pyrimidol.

5. 2-amino-5-vinyl-6-phenyl-4-pyrimidol.

No references cited.